(12) United States Patent
Chen et al.

(10) Patent No.: US 7,386,355 B2
(45) Date of Patent: Jun. 10, 2008

(54) CLOSE LOOP CONTROL SYSTEM AND METHOD OF THE SAME

(75) Inventors: Chin-Chang Chen, Mingjian Township, Nantou County (TW); Wen-Pin Hsu, Sinpu Township, Hsinchu County (TW); Yu-Ta Shen, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 140 days.

(21) Appl. No.: 10/875,488

(22) Filed: Jun. 24, 2004

(65) Prior Publication Data

US 2005/0228512 A1 Oct. 13, 2005

(30) Foreign Application Priority Data

Apr. 7, 2004 (TW) .............................. 93109620 A

(51) Int. Cl.
*G05B 13/02* (2006.01)
*G05B 9/02* (2006.01)

(52) U.S. Cl. ............................. 700/45; 700/30; 700/33; 700/54; 700/79

(58) Field of Classification Search ............ 700/28–30, 700/32–34, 37, 42, 45, 78, 54, 79; 714/25; 123/396, 399, 369
See application file for complete search history.

(56) References Cited

U.S. PATENT DOCUMENTS

| | | | | |
|---|---|---|---|---|
| 3,741,246 A | * | 6/1973 | Braytenbah | 700/289 |
| 5,669,353 A | * | 9/1997 | Shirai et al. | 123/399 |
| 5,682,314 A | * | 10/1997 | Nishino et al. | 701/29 |
| 5,983,860 A | * | 11/1999 | Kitamura et al. | 123/399 |
| 6,089,535 A | * | 7/2000 | Mizutani et al. | 251/129.04 |
| 6,116,214 A | * | 9/2000 | Ishida | 123/399 |
| 6,279,534 B1 | * | 8/2001 | Schreurs et al. | 123/396 |
| 6,317,637 B1 | * | 11/2001 | Limroth | 700/42 |
| 6,798,828 B1 | * | 9/2004 | Phanse | 375/219 |

(Continued)

OTHER PUBLICATIONS

"Modern Control Systems"; Robert H. Bishop, Richard C. Dorf, Addison-Wesly, 1995, pp. 172-175.*

(Continued)

*Primary Examiner*—David Vincent
*Assistant Examiner*—Jennifer L Norton
(74) *Attorney, Agent, or Firm*—Thomas, Kayden, Horstemeyer & Risley

(57) ABSTRACT

A close loop control system includes a controlled system having a controlled variable and a control variable, a first detecting unit, a second detecting unit, and a feedback control unit. The first and the second detecting units detect the controlled system to output a first and a second feedback values corresponding to the control variable. The feedback control unit controls the controlled system according to the differential value of the first or the second feedback value and a predetermined value to stabilize the controlled variable to the predetermined value. The absolute differential value of the first and the second feedback values determines if detecting units are regular. When the absolute differential value is smaller than an error value, the controlled variable is controlled according to the first feedback value. When the absolute differential value is not smaller than the error value, the controlled variable is fixed to a fixed value.

15 Claims, 3 Drawing Sheets

U.S. PATENT DOCUMENTS

2004/0170138 A1* 9/2004 Blevins et al. .............. 370/328
2005/0038885 A1* 2/2005 Agrusa et al. .............. 709/223
2006/0207552 A1* 9/2006 Kato .......................... 123/396
2006/0224255 A1* 10/2006 Tanaka et al. ................ 700/42

OTHER PUBLICATIONS

"Modern Control Systems Analysis & Design: Using Matlab & Simulink"; Robert H. Bishop, Addison-Wesley, 1997, pp. 62-68.*

* cited by examiner

CLOSE LOOP CONTROL SYSTEM AND METHOD OF THE SAME

This application claims the benefit of Taiwan application Serial No. 093109620, filed Apr. 7, 2004, the subject matter of which is incorporated herein by reference.

BACKGROUND OF THE INVENTION

1. Field of the Invention

The invention relates in general to a close loop control system and method of the same, and more particularly to a close loop control system, which uses two detecting units to generate two feedback signals and accordingly determines if the feedback signals are regular, and method of the same.

2. Description of the Related Art

The close loop control system is an essential structure of a variety of automatic control systems, such as water pressure control of the cold water, warm water, and hot water supply systems, the temperature, humidity and static pressure control of the clean room, the static pressure control of the exhausting system, and the acidity, alkalinity or conductivity control of the air conditioning system. The close loop control system uses the detecting unit to feed back signals relative to the control variable for reference of the control unit in program calculating, comparing, and output correction in order that the control variable can be stabilized to the predetermined target value.

Referring to FIG. 1, a block diagram of a conventional close loop control system is shown. The close loop control system 100 includes a controlled system 110, such as a hot water supply system, a detecting unit 120, and a control unit 130. The controlled system 110 has a controlled variable, such as the rotating velocity of the pump motor in the hot water supply system. The detecting unit 120 is a feedback device for detecting the controlled system 110 and outputting a feedback signal A, such as the water pressure, relative to the control variable. The control unit 130 performs a proportional integrated differential (PID) operation, in which the controlled variable of the controlled system 110 is adjusted so that the control variable can reach the expected value according to the comparison between the feedback signal A and a predetermined target value Ao.

When the feedback signal A is larger than the target value Ao, it means that the water pressure (the control variable) supplied by the hot water supply system (the controlled system 110) is too high. Accordingly, the control unit 130 lowers the rotating velocity of the pump motor (the controlled variable) in order to reduce the water pressure. When the feedback signal A is smaller than the target value Ao, it means that the water pressure supplied by the hot water supply system is too low. Accordingly, the control unit 130 increases the rotating velocity of the pump motor to heighten the water pressure.

However, due to the lifetime, quality, and exterior damage issues of the detecting unit 120, its sensing device will be broken down, its pressure guiding tube or connectors will be leaking, and even its transmission device, wires and input module would be irregular. For this reason, the feedback signal A output by the detecting unit 120 will be irregular and thus cannot reflect the real state of the controlled system 110. For example, the present rotating velocity of the pump motor is 1100 rps, and the corresponding water pressure is 20.5 kg/cm$^2$, while the predetermined target value Ao is 20 kg/cm$^2$, and the corresponding rotating velocity of the pump motor is 1050 rps. For the feedback signal A is irregular, the feedback signal A received by the control unit 130 will be fixed to 19 kg/cm$^2$. Therefore, the control unit 130 will determine that the motor rotates too slowly and then increase the rotating velocity until the motor is out of control and the whole hot water supply system is damaged.

Ordinarily, the close loop control system cannot determine if the feedback signal is irregular. Therefore, the above-mentioned system out-of-control issue will occur easily which influences the production and increases the risk of system damage. In addition, when the system sends out the error alarm, mechanics should go to the work field, stop and repair the system by hand, and restart the system after the repair. The system cannot operate continuously as the feedback signal is irregular, thereby influencing the subsequent controlling procedures.

SUMMARY OF THE INVENTION

It is therefore an object of the invention to provide a close loop control system and method of the same. Two feedback signals are provided to determine if the feedback signals are regular, and the controlled variable of the controlled system is fixed as the feedback signal is irregular in order to prevent the controlled system out of control. In addition, the system can operate continuously by using the regular detecting unit, meanwhile the irregular detecting unit can be repaired or renewed. Therefore, the automatic control function of the system can be recovered immediately, which is not limited to the dealing time of the irregular conditions.

The invention achieves the above-identified object by providing a close loop control system, including a controlled system, a first detecting unit, a second detecting unit, and a feedback control unit. The controlled system has a controlled variable and a control variable. The first and the second detecting units detect the controlled system and respectively output a first and a second feedback values corresponding to the control variable. The feedback control unit controls the controlled system by the program calculating output according to the differential value of the first feedback value or the second feedback value and a predetermined value in order that the controlled variable can reach the predetermined value. The absolute differential value of the first feedback value and the second feedback value is used to determine if the detecting units are regular. When the absolute differential value is smaller than a predetermined error value, the controller controls the controlled variable according to the first feedback value while when the absolute differential value is not smaller than the predetermined error value, the controlled variable is fixed to a fixed value.

When the absolute differential value is smaller than the predetermined error value, the feedback control unit performs a PID program operation in which an output value is obtained to control the controlled variable according to the comparison between the selected first feedback value or the second feedback value and a predetermined target value. The feedback control unit comprises a register for storing the output value, and the register stores a fixed number of the latest output values obtained from the PID program operation performed by the feedback control unit. When the absolute differential value is not smaller than the predetermined error value, the feedback control unit fixes the controlled variable to the fixed value according to the average value of the fixed number of output values stored in the register.

The feedback control unit further comprises a determining unit and a controller. The determining unit is used for receiving the first feedback value and the second feedback value, and outputting a determining signal accordingly.

When the absolute differential value of the first and the second feedback values is smaller than the predetermined error value, the determining signal is regular. When the absolute differential value is not smaller than the predetermined error value, the determining signal is irregular. The controller is used for adjusting or fixing the controlled variable according to the determining result. When the determining signal is regular, the controller adjusts the controlled variable according to the comparison between the first feedback value and the predetermined value. When the determining signal is irregular, the controller fixes the controlled variable to the fixed value.

The feedback control unit comprises a switching unit for receiving the first feedback value, and one of the feedback values can be selected as the reference point and output to the controller. When the first or the second feedback value is selected as the reference point, the controller will adjust the controlled variable according to the selected feedback value, and the other feedback value (not the reference point) is used for the determining unit to determine if the feedback value is regular by calculating its absolute differential value with the other feedback value. When the determining signal is regular, the switching unit outputs the feedback value selected as the reference point to the controller. When the determining signal is irregular and it is determined that the detecting unit serving as the reference point is irregular, the switching unit is switched to output the other feedback value (not the reference point) to the controller, meanwhile the determining unit is disabled.

When the determining signal is irregular and it is determined that the irregular detecting unit is not the selected reference point, the determining unit is disabled, the feedback control unit stops fixing the controlled variable, and the controlled variable is continuously controlled according to the output value of the detecting unit originally selected as the reference point. When the irregular first detecting unit or second detecting unit is repaired or renewed, the determining unit is enabled and the determining function of the determining unit is recovered. Therefore, the out-of-control issue of the system can be avoided by fixing the controlled variable as the feedback signal is irregular. In addition, due to the switching function of the feedback value input to the controller and the determining function capable of being enabled and disabled, the system automatic operation can be recovered immediately and the irregular feedback signal issue can be solved under the normal operation of the system.

The invention achieves the above-identified object by providing a close loop control method for controlling the control variable of the controlled system. The close loop control method includes: using a first detecting unit and a second detecting unit to detect the controlled system to respectively obtain a first feedback value and a second feedback value corresponding to the control variable; determining if the absolute differential value of the first feedback value and the second feedback value is smaller than a predetermined error value. If the absolute differential value is smaller than the predetermined error value, the controlled variable is adjusted according to the first feedback value (can be switched), and the step of detecting the controller system is repeated; fixing the controlled variable to a fixed value if the absolute differential value is not smaller than the predetermined error value; adjusting the controlled variable according to the regular first feedback value or second feedback value; and repairing or renewing the irregular first detecting unit or second detecting unit, and repeating the step of detecting the controlled system.

When the absolute differential value is smaller than the predetermined error value, a PID program operation is performed and an output value is obtained to control the controlled variable according to the comparison between the first feedback value and a predetermined target value. The method further comprises storing a fixed number of the latest output values obtained by performing the PID program operation. The step of fixing the controlled variable to the fixed value comprises fixing the controlled variable to the fixed value according to the average value of the fixed number of stored output values. Therefore, when one of the detecting units is broken down, the system can operate continuously by using the other regular detecting unit, which is not limited to the dealing time of the irregular conditions.

Other objects, features, and advantages of the invention will become apparent from the following detailed description of the preferred but non-limiting embodiments. The following description is made with reference to the accompanying drawings.

DETAILED DESCRIPTION OF THE INVENTION

The feature of the invention lies on that two detecting units are used to detect the controlled system and output two feedback signals, by which the system can determine if the feedback signals are regular. When the feedback signals are irregular, the controlled variable of the controlled system is fixed to prevent the controlled system out of control. Moreover, the system can operate continuously by using the regular detecting unit, meanwhile the irregular detecting unit can be repaired, corrected, and maintained. Therefore, the automatic control function of the system can be recovered immediately, which is not limited to the dealing time of the irregular conditions.

Figure 1:
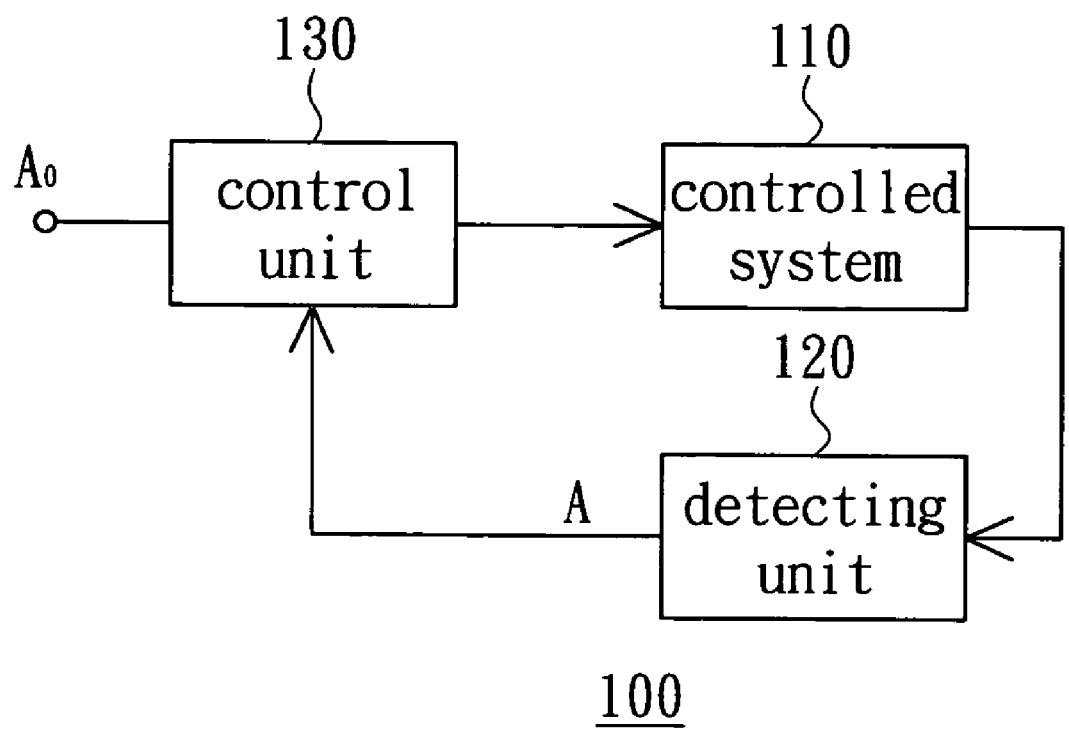
FIG. 1 is a block diagram of a conventional close loop control system.
Figure 2:
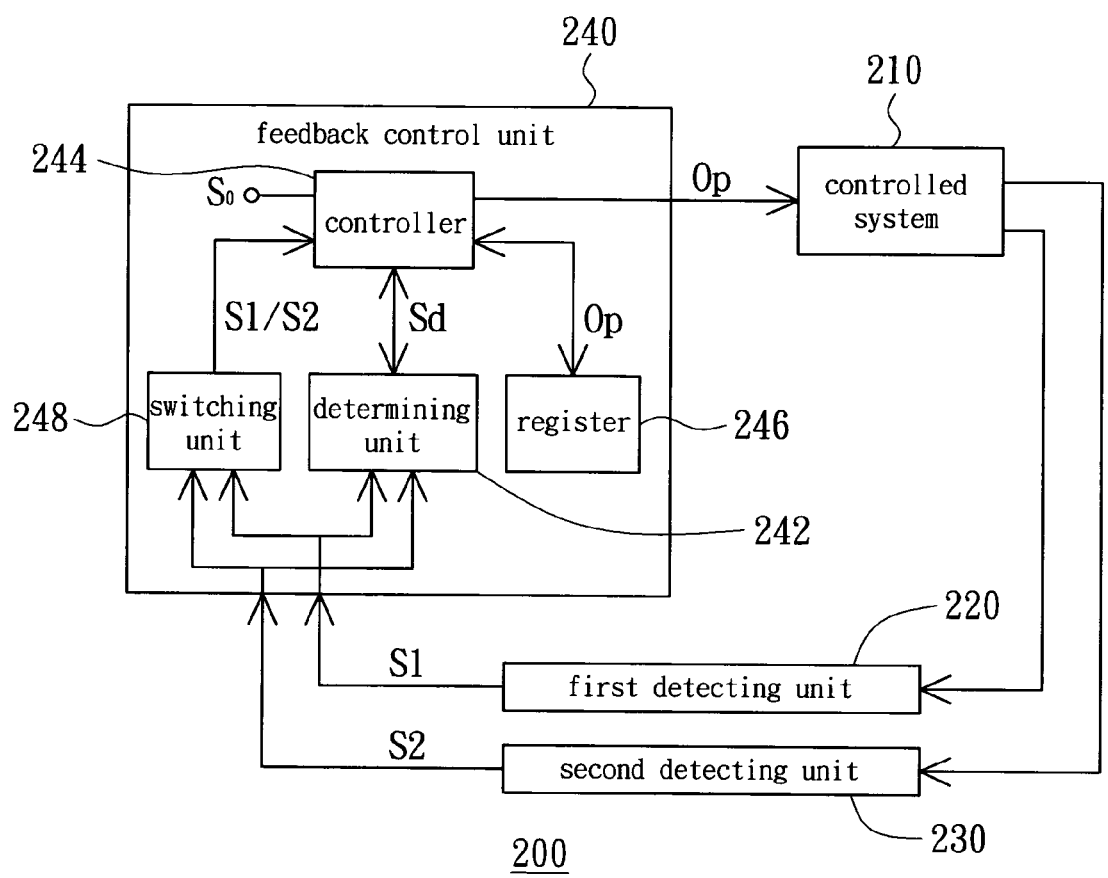
FIG. 2 is a block diagram of the close loop control system according to a preferred embodiment of the invention.

Referring to FIG. 2, a block diagram of the close loop control system according to a preferred embodiment of the invention is shown. The close loop control system 200 includes a controlled system 210, such as a hot water supply system, a first detecting unit 220, a second detecting unit 230, and a feedback control unit 240, which controls a controlled variable of the controlled system 210, such as the rotating velocity of the pump motor in the hot water supply system, to stabilize a control variable to a predetermined value, such as the water pressure of 20 $Kg/m^2$. The first detecting unit 220 and the second detecting unit 230 are used to detect the controlled system 210 to respectively output a first feedback value S1 and a second feedback value S2 corresponding to the control variable, such as the water pressure of the hot water supply system.

In addition, the feedback control unit 240 controls the controlled variable of the controlled system 210 according to the first feedback value S1 and the second feedback value S2. The feedback control unit 240 includes a determining unit 242, a controller 244, a register 246, and a switching unit 248. The determining unit 242 is used to receive the first feedback value S1 and the second feedback value S2, and accordingly output a determining signal Sd. When the absolute differential value X=|S1−S2| of the first feedback value S1 and the second feedback value S2 is smaller than the predetermined error value D.SP, the determining signal Sd is regular, and when the differential value X is not smaller than the predetermined error value D.SP, the determining signal is irregular.

The controller 244 determines if the feedback value S1 or S2 is regular according to the determining signal Sd, and controls the controlled variable accordingly. When the determining signal Sd is regular, the controller 244 performs the PID program operation and adjusts the controlled variable according to the comparison between the first feedback value S1 (or the second feedback value S2), serving as a feedback reference point, and the predetermined target value So. When the determining signal Sd is irregular, the controller 244 will fix the controlled variable to a fixed value Pc in order to maintain the regular operation of the controlled system 210.

In the PID program operation, the controller 244 obtains an output value Op for controlling the controlled variable according to the comparison between the first feedback value S1 (or the second feedback value S2) and the predetermined target value So. The output value Op is, for example, a 12-bit digital value 0~4096, and is converted to an analog signal A, such as an electric current 4~20 mA for controlling the controlled variable, such as, corresponding to a motor rotating velocity of 0~1800 rps. The output value Op output by the controller 244 as the PID program operation is performed will be stored in the register 246 every time. In addition, the data stored in the register 246 will be updated so that a fixed number (such as ten) of the latest output values Op will be maintained in the register 246. Moreover, the switching unit 248 receives the first feedback value S1 and the second feedback value S2 and outputs one of them to the controller 244 as a feedback control reference point to compare with the predetermined target value So.

When the determining signal is regular, it means the first feedback value S1 and the second feedback value S2 are both regular, the controller 244 compares the first feedback value S1 or the second feedback value S2 with the predetermined target value So according to the output of the switching unit 248. When the determining signal Sd is irregular, the switching unit 248 is switched to connect the controller and the regular detecting unit 220 or 230 by hand and the determining unit 242 is disabled. At this time, the controller 244 controls the controlled variable according to the regular feedback value S1 or S2. After the irregular detecting unit 220 or 230 is repaired or renewed, the determining unit 242 is enabled again by hand to control the controlled variable according to the determining signal Sd continuously.

Figure 3:
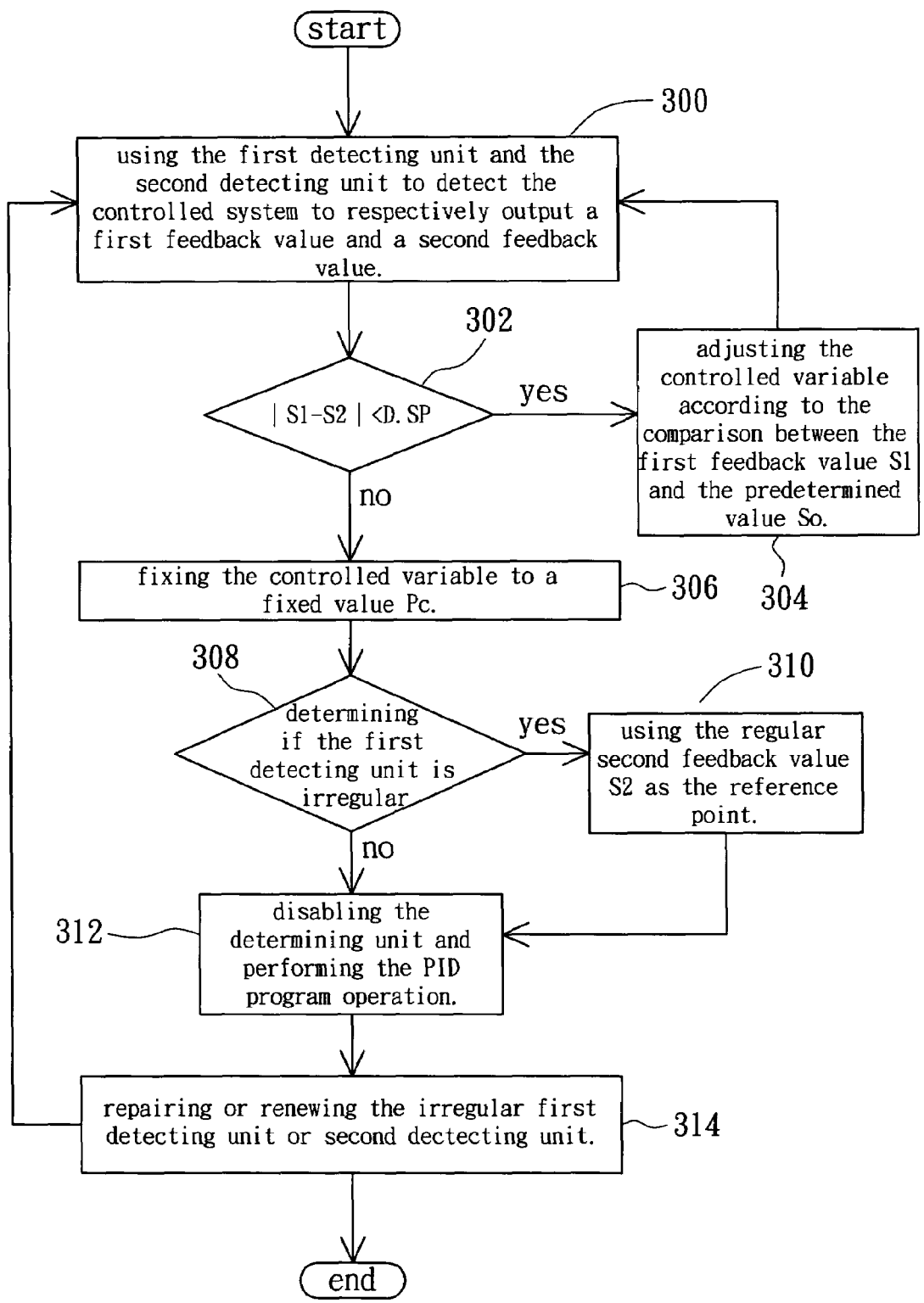
FIG. 3 is a flow chart of the close loop control method according to the preferred embodiment of the invention.

Referring to FIG. 3, a flow chart of the close loop control method according to the preferred embodiment of the invention is shown. First, in the step 300, the first detecting unit 220 and the second detecting unit 230 are used to detect the controlled system 210, such as a hot water supply system, to respectively obtain the first feedback value S1 and the second feedback value S2, such as the hot water supply pressure. Subsequently, in the step 302, if the absolute differential value X=|S1−S2| is smaller than the predetermined error value D.SP is determined. If the absolute differential value is smaller than the predetermined error value D.SP, in the step 304, the PID program operation is performed, that is, the controlled variable is adjusted according to the comparison between the first feedback value S1 (served as the reference point) and the predetermined target value So, and then the step 300 is proceeded. If the absolute differential value X is not smaller than the predetermined target value D.SP, it means that one of the first feedback value S1 and the second feedback value S2 is irregular, that is, one of the first detecting unit 220 and the second detecting unit 230 is broken down. In the step 306, the controller 244 produces an irregular alarm, and fixes the controlled variable to a fixed value Pc according to the average value of the fixed number of output values Op stored in the register 246 at that time. The controller 244 can also fix the controlled variable to the fixed value Pc according to the output value Op stored in the register 246 at a fixed period of time, such as a minute, before the determining signal becomes irregular.

Different from the prior art in which if the feedback signal is irregular cannot be determined due to the output of only one feedback signal, the feature of the invention lies on if the feedback value S1 or S2 received by the controller 244 is regular can be determined by the absolute differential value X of the two feedback values S1 and S2. When the detecting units 220 and 230 are operating in a regular condition, the feedback values S1 and S2 will be very close, that is, the absolute differential value X will be smaller than a predetermined error value D.SP. However, when one of the detecting units 220 and 230 outputs the irregular feedback value S1 or S2 due to the above-mentioned breakdown of the sensing device, transmission device, wires and input module, the absolute differential value of the feedback values S1 and S2 will be larger than the predetermined error value D.SP.

At this time, the controller 244 can determine that the detecting unit 220 or 230 is broken down according to the irregular determining signal output by the determining unit 242, and immediately fix the controlled variable of the controlled system 210 to the fixed value Pc. This fixed value is determined by the average value of the latest fixed number of output values Op stored in the register 246, or the output value Op stored in the register 246 at a fixed period of time, such as a minute, before the detecting units 220 or 230 becomes broken down. Therefore, the fixed value Pc can approximately reflect the real state of the controlled system 210 at that time, such as the real rotating velocity of the pump motor, thereby preventing the whole system out of control as mentioned above.

Afterward, in the step 308, if the first detecting unit 220 is irregular is determined. After receiving the irregular alarm, mechanics go to the work field to check the system immediately. When the first detecting unit 220, serving as the reference point, is found to be broken down, in the step 310, the regular second feedback value S2 is used as the feedback reference point by switching the switching unit 248. In the step 312, the determining unit 242 is disabled temporarily by mechanics to stop the irregular state determination according to the absolute differential value, to stop fixing the controlled variable, and to recover the PID program operation. At this time, the controlled variable is adjusted according to the comparison between the regular second feedback value S2 and the predetermined target value So. If the mechanics find that the second feedback value S2 (not the reference point) is irregular after receiving the irregular alarm and reaching the work field. The step 312 is carried out, in which mechanics disable the determining unit 242 temporarily to stop the irregular state determination, to stop fixing the controlled variable, and to recover the original PID program operation.

Finally, in the step 314, after the broken-down detecting unit 220 or 230 is repaired or renewed, and it is ensured the feedback values S1 and S2 output by the two detecting units 220 and 230 are regular, the determining unit 242 is enabled by the mechanics, and the step 300 is repeated to detect the controlled system 210 and output two feedback values.

According to the above-mentioned preferred embodiment, the close loop control system in the invention has the following advantages:

1. In the close loop control system of the invention, two feedback reference points can be used alternatively. The controller can determine if the feedback signals are regular according to the two feedback signals, and fix the controlled variable of the controlled system as the feedback signal is irregular, thereby preventing the whole system out of control to influence the production.

2. The close loop control system in the invention can fix the controlled variable of the controlled system as the feedback signal is irregular to maintain system's regular operation and is switched to use the regular feedback value as the feedback reference point. Therefore, the broken-down detecting unit can be repaired, corrected, and maintained without breaking off the system, and the automatic control function can be recovered immediately, which is not limited to the dealing time of the irregular conditions.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A close loop control system, comprising:
   a controlled system, having a controlled variable and a control variable;
   a first detecting unit, for detecting the controlled system to output a first feedback value corresponding to the control variable;
   a second detecting unit, for detecting the controlled system to output a second feedback value corresponding to the control variable; and
      a feedback control unit, for controlling the controlled variable according to an absolute differential value of the first feedback value and the second feedback value, the feedback control unit comprising:
         a determining unit for receiving the first feedback value and the second feedback value and outputting a determining signal according to the absolute differential value of the first feedback value and the second feedback value;
         a controller, in response to the determining signal, wherein when the determining signal indicates that the absolute differential value is smaller than a predetermined error value, the controller of the feedback control unit adjusts the controlled variable according to a selected one of the first feedback value and the second feedback value, and controls the controlled variable according to the comparison between the selected one of the first and the second feedback values and a predetermined target value; and
         a register for storing at least an output value obtained from the feedback control unit, wherein the at least the output value comprises a fixed number of output values obtained from the feedback control unit;
   wherein when the determining signal indicates an abnormal situation where the absolute differential value is not smaller than the predetermined error value, the controller of the feedback control unit fixes the controlled variable to a fixed value based on an average value of the at least the output value stored in the register so that the controlled system is prevented from being stopped and out of control and continues to operate in the abnormal situation while the first detecting unit and the second detecting unit are able to be repaired or renewed.

2. The system according to claim 1, wherein when the determining signal indicates that the absolute differential value is smaller than the predetermined error value, the feedback control unit performs a PID program operation in which the at least the output value is obtained to control the controlled variable according to the comparison between the selected one of the first feedback value the second feedback value and the predetermined target value.

3. The system according to claim 1, wherein after the feedback control unit fixes the controlled variable to the fixed value, the feedback control unit controls the controlled variable according to a regular one of the first feedback value and the second feedback value.

4. The system according to claim 3, wherein after the irregular first detecting unit or second detecting unit is repaired or renewed, the feedback control unit controls the controlled variable according to the absolute differential value.

5. The system according to claim 1, wherein
   when the absolute differential value is smaller than the predetermined error value, the determining signal is regular, while when the absolute differential value is not smaller than the predetermined error value, the determining signal is irregular; and
   when the determining signal is regular, the controller adjusts the controlled variable according to the selected one of the first feedback value and second feedback value, while when the determining signal is irregular, the controller fixes the controlled variable to the fixed value.

6. The system according to claim 5, wherein the feedback control unit comprises a switching unit for receiving the first feedback value and the second feedback value and outputting one of them alternatively, and when the determining signal is regular, the switching unit outputs the selected one of the first feedback value and the second feedback value to the controller.

7. The system according to claim 6, wherein when the determining signal is irregular and it is determined that the first detecting unit is irregular, the switching unit is switched to output the second feedback value to the controller, meanwhile the determining unit is disabled.

8. The system according to claim 7, wherein when the determining signal is irregular and it is determined that the irregular detecting unit is not a selected reference point, the determining unit is disabled and the controlled variable is continuously controlled according to the output value of the originally selected detecting unit.

9. The system according to claim 8, wherein when the irregular first detecting unit or second detecting unit is repaired or renewed, the controller enables the determining unit and controls the controller variable according to the determining signal again.

10. A close loop control method, for controlling a controlled variable of a controlled system, the close loop control method comprising:
   detecting the controlled system using a first detecting unit and a second detecting unit to respectively obtain a first feedback value and a second feedback value corresponding to the control variable;

determining if an absolute differential value of the first feedback value and the second feedback value is smaller than a predetermined error value, wherein if the absolute differential value is smaller than the predetermined error value, the controlled variable is adjusted according to the first feedback value or the second feedback value, which is selected as a reference point, and the step of detecting the controller system is repeated;

if the absolute differential value is smaller than the predetermined error value, performing a PID program operation to obtain an output value to control the controlled variable according to the comparison between the first feedback value or second feedback value, selected as the reference point, and a predetermined target value; and storing a fixed number of the latest output values obtained by performing the PID program operation;

if an abnormal situation where the absolute differential value is not smaller than the predetermined error value is determined, fixing the controlled variable to a fixed value based on the average value of the stored output values so that the controlled system is prevented from being stopped and out of control and continues to operate in the abnormal situation while the first detecting unit and the second detecting unit are able to be repaired or renewed; and sending a signal indicating that the abnormal situation happens so as to have the irregular first detecting unit or second detecting unit repaired or renewed while the controlled system is operating in the abnormal situation;

recovering from the abnormal situation by repeating the step of detecting the controlled system using the first detecting unit and the second detecting unit.

11. The method according to claim 10, wherein after the step of fixing the controlled variable, the method further comprises: the step of adjusting the controlled variable according to the regular first feedback value or second feedback value, comprising determining if the first detecting unit and the second detecting unit are irregular, if the first detecting unit is irregular, the controlled variable is adjusted according to the comparison between the regular second feedback value and the predetermined target value, and if the first detecting unit is regular, the controlled variable is adjusted according to the comparison between the regular first feedback value and the predetermined target value.

12. The method according to claim 10, wherein the controlled system is a hot water supply system, and the control variable indicates water pressure supplied by the hot water supply system.

13. The method according to claim 12, wherein the controlled system includes a pump motor and the controlled variable indicates rotating velocity of the pump motor.

14. The system according to claim 1, wherein the controlled system is a hot water supply system, and the control variable indicates water pressure supplied by the hot water supply system.

15. The system according to claim 14, wherein the controlled system includes a pump motor and the controlled variable indicates rotating velocity of the pump motor.

* * * * *